(12) United States Patent
Sivanath et al.

(10) Patent No.: US 12,515,332 B2
(45) Date of Patent: Jan. 6, 2026

(54) SYSTEM AND METHOD FOR SEQUENCING ASSEMBLY TASKS

(71) Applicant: eBots Inc., Fremont, CA (US)

(72) Inventors: Sabarish Kuduwa Sivanath, San Jose, CA (US); Zheng Xu, Pleasanton, CA (US)

(73) Assignee: eBots Inc., Fremont, CA (US)

( * ) Notice: Subject to any disclaimer, the term of this patent is extended or adjusted under 35 U.S.C. 154(b) by 423 days.

(21) Appl. No.: 18/100,451

(22) Filed: Jan. 23, 2023

(65) Prior Publication Data

US 2023/0249345 A1 Aug. 10, 2023

Related U.S. Application Data

(60) Provisional application No. 63/308,339, filed on Feb. 9, 2022.

(51) Int. Cl.
*B25J 9/16* (2006.01)
*G05B 19/41* (2006.01)
*G05B 19/4155* (2006.01)

(52) U.S. Cl.
CPC ........ *B25J 9/1661* (2013.01); *G05B 19/4155* (2013.01); *G05B 2219/50391* (2013.01)

(58) Field of Classification Search
CPC ...... B25J 9/1661; B25J 9/1656; B25J 9/1671; G05B 19/4155; G05B 2219/50391; G05B 2219/40099; G05B 2219/40392; G05B 2219/40607; G05B 19/409; G06Q 10/06311; G06Q 10/06313; G06Q 10/06316; G06Q 10/0633; G06Q 10/101; G06Q 50/04

USPC ......................................................... 700/264
See application file for complete search history.

(56) References Cited

U.S. PATENT DOCUMENTS

| | | | |
|---|---|---|---|
| 2020/0206920 A1* | 7/2020 | Ma ....................... G06F 11/3476 |
| 2021/0023707 A1* | 1/2021 | Ma ......................... B25J 9/1697 |
| 2021/0069905 A1* | 3/2021 | Zhang .................... B25J 9/1664 |
| 2022/0035375 A1* | 2/2022 | Rezaee ..................... G06N 3/08 |
| 2022/0266453 A1* | 8/2022 | Lonsberry ............. G06V 10/82 |
| 2023/0071488 A1* | 3/2023 | Kanemoto ............. B25J 9/1697 |
| 2023/0321828 A1* | 10/2023 | Ogawa ................... B25J 9/1664 |
| | | | 700/245 |

* cited by examiner

*Primary Examiner* — Kira Nguyen
(74) *Attorney, Agent, or Firm* — Yao Legal Services, Inc.; Shun Yao

(57) ABSTRACT

One embodiment can provide a method and system for configuring a robotic system. During operation, the system can present to a user on a graphical user interface an image of a work scene comprising a plurality of components and receive, from the user, a sequence of operation commands. A respective operation command can correspond to a pixel location in the image. For each operation command, the system can determine, based on the image, a task to be performed at a corresponding location in the work scene and generate a directed graph based on the received sequence of operation commands. Each node in the directed graph can correspond to a task, and each directed edge in the directed graph can correspond to a task-performing order, thereby facilitating the robotic system to perform a sequence of tasks based on the sequence of operation commands.

18 Claims, 8 Drawing Sheets

SYSTEM AND METHOD FOR SEQUENCING ASSEMBLY TASKS

RELATED APPLICATIONS

This claims the benefit of U.S. Provisional Patent Application No. 63/308,339, entitled "SYSTEM AND METHOD FOR SEQUENCING ASSEMBLY TASKS," by inventors Sabarish Kuduwa Sivanath and Zheng Xu, filed 9 Feb. 2022, the disclosure of which is incorporated herein by reference in its entirety for all purposes.

BACKGROUND

Field

This disclosure is generally related to a system and method for controlling the operation of a robotic system. Particularly, this disclosure is related to a user interface that allows a user to define a sequence of tasks, thereby facilitating the robotic system in performing the sequence of tasks.

Related Art

Advanced robotic technologies have dramatically changed the way products are produced and led to the fourth industrial revolution (also referred to as Industry 4.0). The fourth industrial revolution improves the computing and automation technologies developed during the third industrial revolution by allowing computers and robotics to connect and communicate with one another to ultimately make decisions without human involvement. A combination of cyber-physical systems, the Internet of Things (IoT), and the Internet of Systems (IoS) makes Industry 4.0 possible and the smart factory a reality. Smart machines (e.g., robots) can get smarter as they gain access to more data and learn new skills, which can lead to more efficient and productive and less wasteful factories. Ultimately, a network of digitally connected smart machines that can create and share information will result in the true "lights-out manufacturing" where no human supervision is needed.

With the development of the three-dimensional (3D) computer vision technology, electrical/electronic industries have started to use robots in their assembly lines to replace human workers. Assembling electronic devices (especially consumer electronics like smartphones, digital cameras, tablet or laptop computers, etc.) typically can require hundreds of delicate tasks, such as placement of a component, insertion of a connector, routing of a cable, etc. More importantly, these tasks need to be performed in a particular order to successfully assemble an electronic device. In a manufacturing setting, the same robot may be used to assemble different kinds of electronic devices. The types of tasks and the corresponding order for performing these tasks can vary from device to device. Configuring the robot to perform the different tasks in different orders can be time consuming and often require highly skilled labor (e.g., an engineer with knowledge of the robotic control system may be needed to program the robot to perform a sequence of tasks).

SUMMARY

One embodiment can provide a method and system for configuring a robotic system. During operation, the system can present to a user on a graphical user interface an image of a work scene comprising a plurality of components and receive, from the user, a sequence of operation commands. A respective operation command can correspond to a pixel location in the image. For each operation command, the system can determine, based on the image, a task to be performed at a corresponding location in the work scene and generate a directed graph based on the received sequence of operation commands. Each node in the directed graph can correspond to a task, and each directed edge in the directed graph can correspond to a task-performing order, thereby facilitating the robotic system in performing a sequence of tasks based on the sequence of operation commands.

In a variation on this embodiment, the graphical user interface can include a touchscreen display, and the respective operation command can correspond to the user tapping the pixel location in the image.

In a variation on this embodiment, determining the task to be performed at the corresponding location can include converting the pixel location in the image to the corresponding location in the work scene and identifying a component located at the corresponding location in the work scene.

In a further variation, the system can access a component library to obtain information associated with the identified component and present the information associated with the identified component to the user to allow the user to verify or modify such information.

In a further variation, the information associated with the component can include one or more: a three-dimensional model of the component, an operation type associated with the component, and a second component to be coupled to the component.

In a variation on this embodiment, determining the task can include receiving a user input indicating a component to be placed at the corresponding location in the work scene.

In a variation on this embodiment, in response to a user command, the system can control the robotic system to perform the sequence of tasks in a second work scene based on the directed graph.

In a further variation, controlling the robotic system to perform the sequence of tasks can include capturing images of the second work scene; reconstructing the directed graph for the second work scene based on the captured images; obtaining, for each node in the reconstructed directed graph, task information associated with a task corresponding to the node; and generating, by a controller of the robotic system, motion commands based on the obtained task information.

In a variation on this embodiment, the task information can include one or more of: location information, component information, and operation type information.

In a further variation, the operation type information can indicate whether the task comprises an insertion task or a placement task.

One embodiment can provide an apparatus for configuring a robotic system. The apparatus can include a graphical user interface to present an image of a work scene comprising a plurality of components and to receive, from a user, a sequence of operation commands. A respective operation command can correspond to a pixel location in the image. The apparatus can further include a computer-vision system to determine, for each operation command and based on the image, a task to be performed at a corresponding location in the work scene and a graph-construction unit to generate a directed graph based on the received sequence of operation commands. Each node in the directed graph can correspond to a task, and each directed edge in the directed graph can correspond to a task-performing order, thereby facilitating the robotic system in performing a sequence of tasks based on the sequence of operation commands.

BRIEF DESCRIPTION OF THE FIGURES

In the figures, like reference numerals refer to the same figure elements.

DETAILED DESCRIPTION

Figure 1:
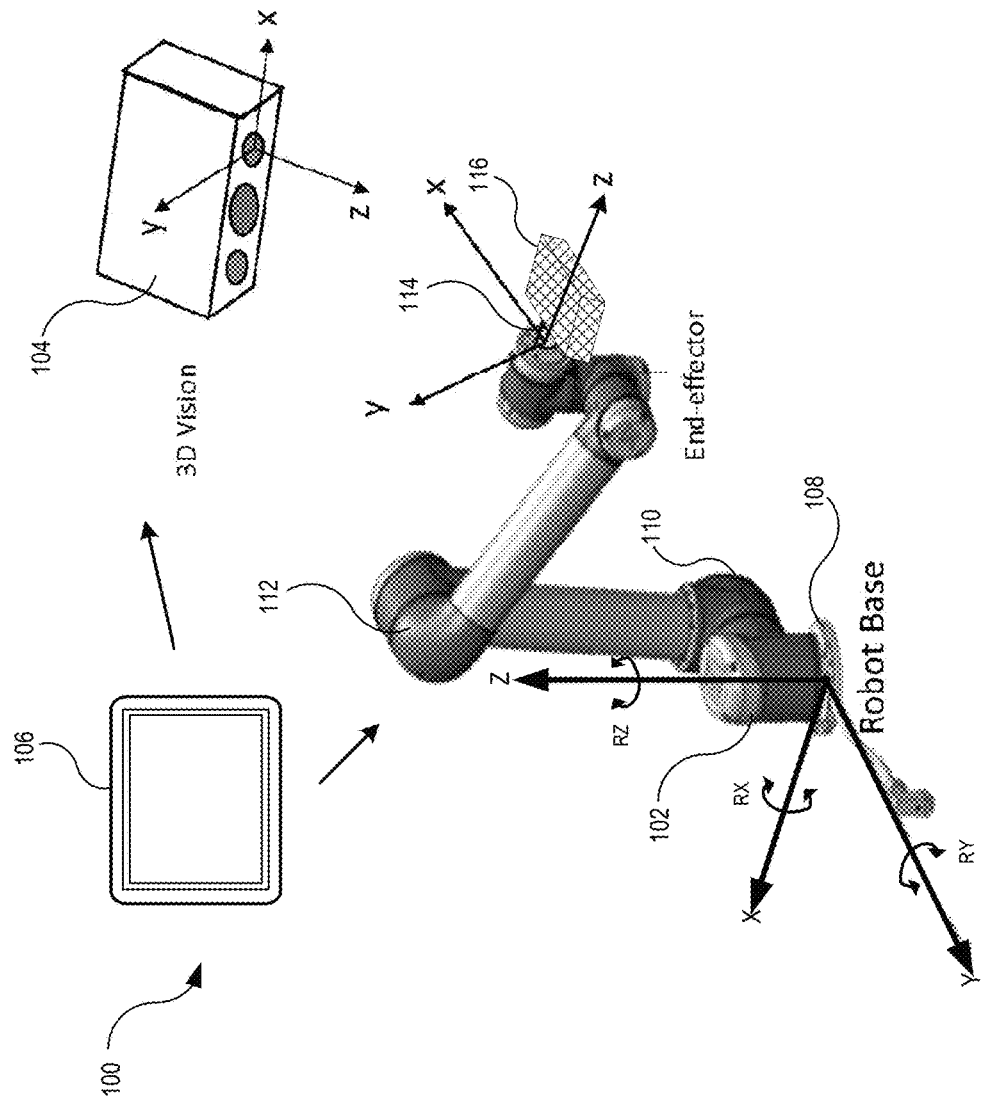
FIG. 1 illustrates an exemplary robotic system, according to one embodiment.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of the efficient configuration of a robotic system. More specifically, the solution takes advantage of the perception (i.e., computer vision) of the robotic system while providing a user interface to a user to configure the robotic system through the user interface. The user interface can include a scene-display area that display an image of the work scene captured by cameras of a computer-vision system. The work scene can include a number of components to be operated on by the robot, and the computer-vision system can have the ability to "understand" the work scene (e.g., identifying or finding components of interest, measuring dimensions of the components, computing the pose of the gripper for grasping a component, etc.). To configure the robotic system to automatically perform a sequence of tasks, a user can sequentially select, by clicking/tapping on the displayed image, a number of components or locations based on the order of the tasks in the sequence. Each time a component or location is selected, the user can also define a type of operation (e.g., insertion or placement operation) to be performed on the component or at the location. Based on the user's input, the system can generate a directed graph to represent a task sequence, with each node in the graph corresponding to a task to be performed by the robot. The directed graph can be stored in a task-sequence database. During the operation of the robot, to perform a particular task sequence, the robotic system can access the task-sequence database to obtain a directed graph corresponding to the particular task-sequence. The robotic system can then "reconstruct" the directed graph by performing the tasks corresponding to the nodes in the directed graph.

A Robotic System with 3D Computer Vision

An efficient robotic system can imitate a human and can include arms/hands, eyes, and a brain. Like a human arm, a robotic arm can use its hand and fingers (e.g., an end-effector) to pick up or grasp a component of interest, bring the component to a desired mounting location, and mount the component. Like a human using eyes to guide arm motion, the robotic system can use computer vision to guide the motion of the robotic arm. The movement of a human's arm is controlled by the brain, and similarly, the movement of the robotic arm is controlled by the robotic controller, which uses visual information provided by the computer vision to determine the pose(s) of the gripper in order to perform a certain task or a sequence of tasks. In conventional approaches, a skilled engineer needs to program the robotic controller based on the actual task sequence (e.g., a task sequence used to assemble a particular product) to be performed by the robot. When the robot has to switch jobs (e.g., from assembling one product to another), the skilled engineer is needed again to reprogram the robotic controller, which can be time-consuming. To simplify the configuration process of a robotic system (e.g., manual programming of the robotic controller), in some embodiments of the instant application, the robotic system can include a user interface (which can be part of a human-machine interface (HMI)) that facilitates easier and more efficient configuration of the robotic system. A human operator without special knowledge of robotic control can simply "show" the robot how to perform a sequence of tasks by entering simple commands to the HMI via the user interface. The HMI can then interact with the robotic controller to control the robotic arm to perform the task sequence.

FIG. 1 illustrates an exemplary robotic system, according to one embodiment. Robotic system 100 can include a robotic arm 102, a 3D computer-vision system 104, and an HMI 106. In some embodiments, robotic arm 102 can include a base 108, multiple joints (e.g., joints 110 and 112), and a gripper 114. The combination of the multiple joints can enable robotic arm 102 to have an extensive range of movement and have six degrees of freedom (6DoF). Gripper can grasp a component of interest (e.g., component 116) and manipulate the component (e.g., move it to a desired location, place it into a desired pose, etc.) to perform a desired task.

3D computer-vision system 104 (which may include multiple cameras) can capture images of the work scene, including gripper 114, component grasped by gripper 114, and other components that may be present in the work scene. In addition to cameras, 3D computer-vision system 104 can also include various mechanisms for "understanding" the work scene based on the captured images. For example, 3D computer-vision system 104 can include mechanisms for detecting/identifying components, mechanisms for measuring the sizes of the components, mechanisms for computing the poses of the grippers, etc.

FIG. 1 shows three different Cartesian coordinate systems (e.g., X-Y-Z), including a coordinate system with its origin at the robot base (referred to as the robot-base coordinate system), a coordinate system with its origin centered at the tool/gripper (referred to as the tool-center coordinate system), and a coordinate system with its origin at the center of the cameras (referred to as the camera coordinate system). The robotic controller (not shown in FIG. 1) typically controls the motion of robotic arm 102 in reference to the robot-base coordinate system. The cameras typically observe the scene (including the observed pose of gripper 114) in reference to the camera coordinate system. The actual pose of a grasped component can be computed in the tool-center coordinate system. Various mechanisms can be used to facilitate the transformation of coordinates among the different coordinate systems. For example, calibration targets and machine-learning techniques can be used to calibrate the transformation from the camera coordinate system to the robot-case coordinate system (such transformation is referred to as eye-to-hand coordination). A more detailed description of the techniques used to reduce errors in robotic eye-to-hand coordination can be found in U.S. patent application Ser. No. 17/751,228, entitled "SYSTEM AND METHOD FOR ERROR CORRECTION AND COMPENSATION FOR 3D EYE-TO-HAND COORDINATION," by inventors Sabarish Kuduwa Sivanath and Zheng Xu, filed May 2022, the disclosure of which is incorporated herein by reference.

HMI 106 can provide a graphical user interface (GUI) that allows a user to enter user commands to define a task sequence. In some embodiments, the GUI can display an image of the work scene captured by the camera(s) of 3D computer-vision system 104. The work scene can be a snapshot of the assembly process of a device. For example, it may show a half-assembled smartphone. There can be a number of components within the image, some assembled into the device and some not. The user can define a task sequence by selecting (e.g., using a mouse pointer, a stylus, or a finger), according to a predetermined sequence, multiple components displayed on the user interface. Each selection can define a task to be performed on the selected component. In some embodiments, the perception unit within 3D computer-vision system 104 can determine, based on the pixel location of the user's selection, a corresponding location in the work scene and the component at the corresponding location. For example, the user can click or tap a circuit component shown in the image. The perception unit within 3D computer-vision system 104 can translate the pixel location on the screen to a location in the work scene (e.g., represented using coordinates of the world-coordinate system). Moreover, the perception unit within 3D computer-vision system 104 can recognize the type of the component and can access a component library to obtain a 3D model (e.g., a point cloud) of the component. The 3D model can provide dimension and orientation information associated with the component.

For each component, the component library can also include information specifying a predefined operation to be performed on the component. For example, for a cable component, information included in the component library can specify that an operation to be performed on the cable is an insertion operation. If the component is a camera unit in a smartphone, the component library can specify that an operation to be performed on the camera unit is a placement operation. For a component associated with an insertion operation, the component library can also include the associated pair information. Note that the associate pair information about a particular component specifies a different component to be inserted into or coupled with the particular component. For example, a cable can be the associated pair of a corresponding cable connector receiving the cable, a pad can be the associated pair of a corresponding pad socket, and so on.

In some embodiments, subsequent to the user selecting a component in the displayed image, the GUI can prompt the user to confirm various information associated with the selected component, such as the type of the component, the size (e.g., width, height, etc.) of the component, the type of operation (e.g., an insertion operation or a placement operation) to be performed on the component, the location of the component within the work scene, the associated pair of the component, the color of the component, etc. Note that the size of the component can be determined by fitting a minimum bounding box to the component. The user can confirm/accept the information presented on the user interface or edit certain information based on the user's knowledge about the component.

If the user clicks/taps a blank space in the image (e.g., a location without a component), the perception unit within 3D computer-vision system 104 can recognize that there is no component there and infer that a corresponding operation would be a placement operation (i.e., a component is to be placed at the selected location). In such a scenario, the GUI can prompt the user to enter information (e.g., the type or part number) associated with the component to be placed at the location. Other information associated with the to-be-placed component (e.g., a corresponding 3D model) can be obtained from the component library based on the user's input.

In some embodiments, 3D computer-vision system 104 can include a structured-light projector that can project codified images (e.g., spatially varying light patterns) onto the work scene. When the user clicks/taps the image displaced by HMI 106, cameras within 3D computer-vision system 104 can capture a series of images of the work scene with the projected structured-light patterns. These images can be used to obtain the correspondence between the camera pixel location and the projector pixel location. For each point in the image, a corresponding 3D point in the world coordinate system can be obtained through triangulation using calibration matrices. Various object-detection techniques (e.g., image segmentation) can be used to recognize a component selected by the user. For, the image can be segmented using a Mask Region-based Convolutional Neural Network (Mask R-CNN). To improve the segmentation accuracy, 3D computer-vision system 104 can include multiple single-color light sources to obtain pseudo-color images. A more detailed description of the image segmentation based on pseudo-color images can be found in U.S. patent application Ser. No. 18/098,427, entitled "SYSTEM AND METHOD FOR IMPROVING IMAGE SEGMENTATION," by inventors Zheng Xu, John W. Wallerius, and Sabarish Kuduwa Sivanath, filed 18 Jan. 2023, the disclosure of which is incorporated herein by reference.

Once a component is recognized, the pose of the component can be estimated based on the 3D point cloud computed by 3D computer-vision system and the 3D model of the component. The dimension information of the component can also be obtained accordingly.

HMI 106 can further include a graph-construction unit that can construct a directed graph based on the user's clicking/tapping operations and information obtained from the component library. More specifically, each user selection can correspond to a node in the directed graph and the direction of the graph (i.e., the directed edges) indicate the sequence of the user's selections.

Figure 2:
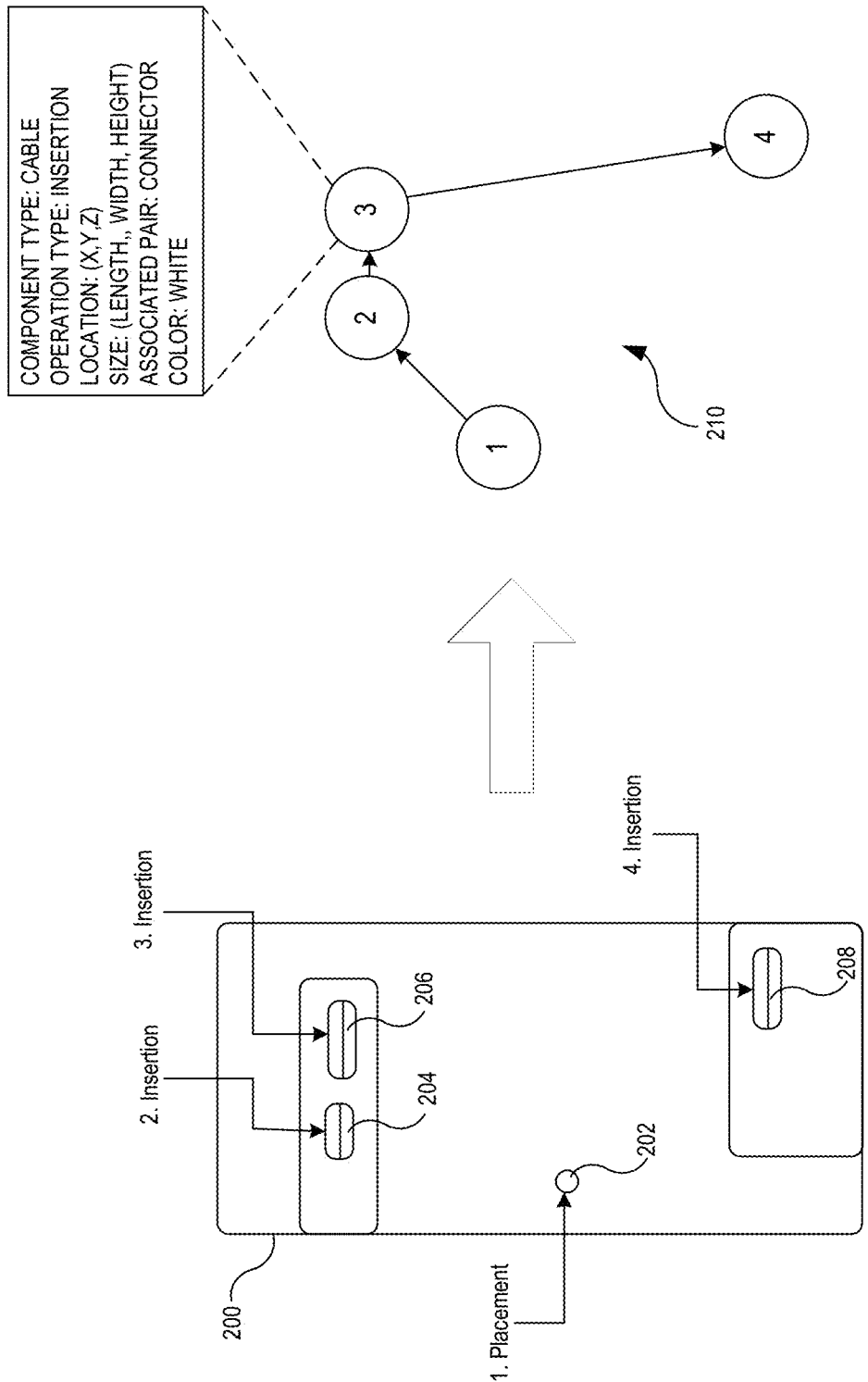
FIG. 2 illustrates an exemplary scenario for constructing a graph based on user inputs, according to one embodiment.

FIG. 2 illustrates an exemplary scenario for constructing a graph based on user inputs, according to one embodiment. In FIG. 2, the GUI displays a work scene comprising a to-be-assembled electronic device 200. In this example, a user can select locations/components in electronic device 200 by clicking or tapping (in the case of a touchscreen), in sequence, locations/components 202 through 208. More specifically, the user selects location 202 first, which corresponds to a placement operation, and the user then selects components 204-208, each of which corresponds to an insertion operation.

A directed graph 210 can be constructed based on the user's selections. In this example, Node 1 in graph 210 corresponds to the user's selection of location 202, and Nodes 2-4 in graph 210 correspond, respectively, to the user's selections of components 204-208. Each node can represent a task to be performed at the selected location or on the selected component. Each directed edge (e.g., the edge between Node 1 and Node 2) in the graph indicates a task-performing order. For example, the edge pointing from Node 1 to Node 2 indicates that a task corresponding to Node 2 should be performed after the performance of a task corresponding to Node 1. In this example, the task-performing order of the entire sequence is from Node 1 to Node 4, following the order of the user's selections.

When a node representing a task in directed graph 210 is generated, the HMI can also store information associated with the task or operation in the node, including but not limited to: the component type, the operation type, the location, the size of the component, the associate pair information, and other data. In one example, the location can be expressed as a set of coordinates (e.g., (x, y, z)) according to a particular coordinate system (e.g., the camera coordinate system or the robot-case coordinate system). The size of the component can include length, width, height, etc. As discussed previously, the HMI can access the component library to obtain various information associated with the component. FIG. 2 illustrates the exemplary information associated with Node 3. In one embodiment, the directed graph can also be presented in the GUI, and when the user hovers the mouse or holds a finger over a particular node, information associated with the node can be displayed in the GUI. The user can then confirm or modify such information.

In some embodiments, in addition to indicating the order of operations or tasks, the edges in directed graph 210 can also indicate the physical distance/direction between the locations of consecutive operations or tasks. For example, the edge between Node 1 and Node 2 can be illustrated as a vector in graph 210, and the length and direction of the vector can correspond to the distance and direction, respectively, between location 202 and component 204. Note that, when the robotic system is performing the task sequence, the displacement of the robotic arm (e.g., direction and distance) between consecutive tasks can correspond to an edge in directed graph 210.

In the example shown in FIG. 2, the directed graph is generated based on one image of the work scene, and the task sequence includes only four tasks/operations. In practice, the work scene can be evolving, and additional images of the work scene can be captured as the assembly process progresses. In some embodiments, multiple images of the work scene can be displayed one by one to the user, according to the task sequence. The user can select one or more locations/components in each image based on the execution order of the tasks in the sequence. The number of operations/tasks in a generated task sequence can be much larger than four. For example, a task sequence for assembling an electronic device can include tens or even hundreds of operations.

Figure 3:
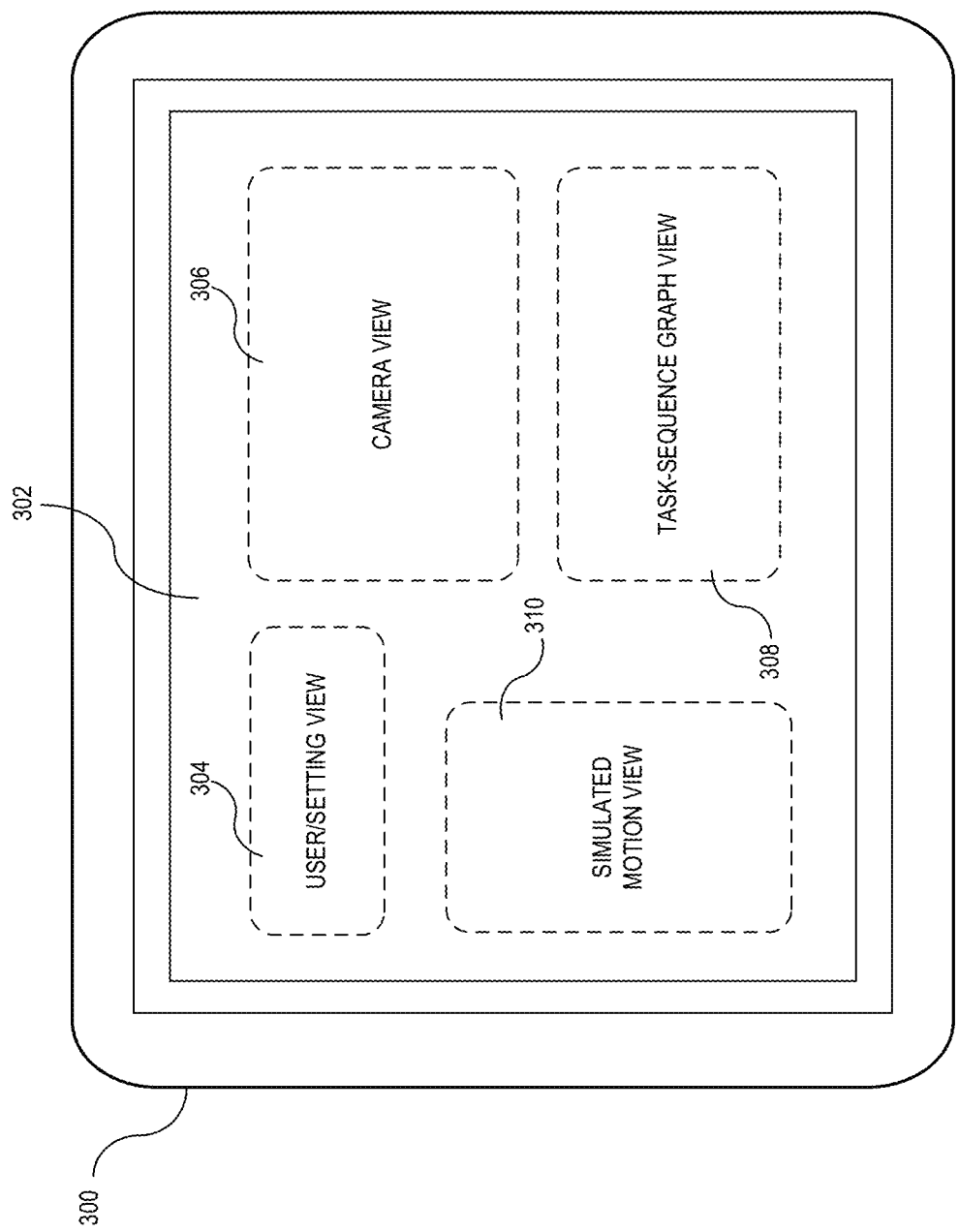
FIG. 3 illustrates an exemplary graphical user interface (GUI) presented by a human-machine interface (HMI) apparatus, according to one embodiment.

FIG. 3 illustrates an exemplary graphical user interface (GUI) presented by a human-machine interface (HMI) apparatus, according to one embodiment. FIG. 3 illustrates a display (e.g., a touchscreen display) 300 of an HMI. Display 300 can present a GUI 302, which can include a number of display areas. In the example shown in FIG. 3, four display areas (areas 304-310) can be presented simultaneously on display 300, with each display area occupying a portion of GUI 302. In alternative embodiments, the different display areas can be presented as different pages, with each page occupying the entire screen of display 300. A user can switch the view of GUI 302 from one page to the next.

Display area 304 can display information associated with the user and/or system settings. The user can modify the user settings as well as the system settings via display area 304.

Display area 306 presents the camera view of the computer-vision system associated with the HMI. During the configuration of the robotic system, display area 306 can display an image of the work scene captured by the camera(s) of the computer-vision system, and a user can configure the robotic system by clicking via a mouse (or tapping by a finger) certain locations in the displayed image. The locations and order of the clicking or tapping operations correspond to a task sequence to be performed by the robotic system, with each clicking or tapping operation defining a task. In one embodiment, GUI 302 can include a sequence-completion button adjacent to display area 306. After defining the last task to be performed in a sequence (e.g., by selecting, for the last time, a location/component in the image displayed in display area 306), the user can click/tap the sequence-completion button to indicate that the task sequence is completed.

Display area 308 can display a directed graph corresponding to the user-defined task sequence. The directed graph can be generated by the system based on the user inputs (i.e., the locations/components selected by the user from the image displayed in display area 306). The directed graph can be similar to graph 210 shown in FIG. 2. In one embodiment, the directed graph can be displayed concurrently as the user makes the selections, meaning that a node can be added to the directed graph displayed in display area each time the user clicks or taps a location (or a component) in display area 306. In addition to the node, node information can also be displayed in display area 308. The user has to confirm or modify the node information (e.g., component type, operation type, location, component size, associate pair, etc.) before the next selection can be made in display area 306. In an alternative embodiment, the directed graph can be generated and displayed after the user has defined the entire task sequence (i.e., the user has selected all locations/components), and the user can then review node information for each node in the directed graph to confirm or modify the node information.

Display area 310 can display a simulated motion view of the robotic arm for performing the task sequence. In some embodiments, the HMI can communicate with the controller of the robotic system. For example, the HMI can send the information associated with each task (i.e., the node information) in the sequence to the controller, and the controller can generate motion commands corresponding to the sequence of tasks. A motion-simulation unit in the HMI system can simulate the movement of the robotic arm based on the motion commands. The user can review the simulated movement of the robotic arm to determine whether the motion sequence contains errors. This feature can be optional.

Figure 4:
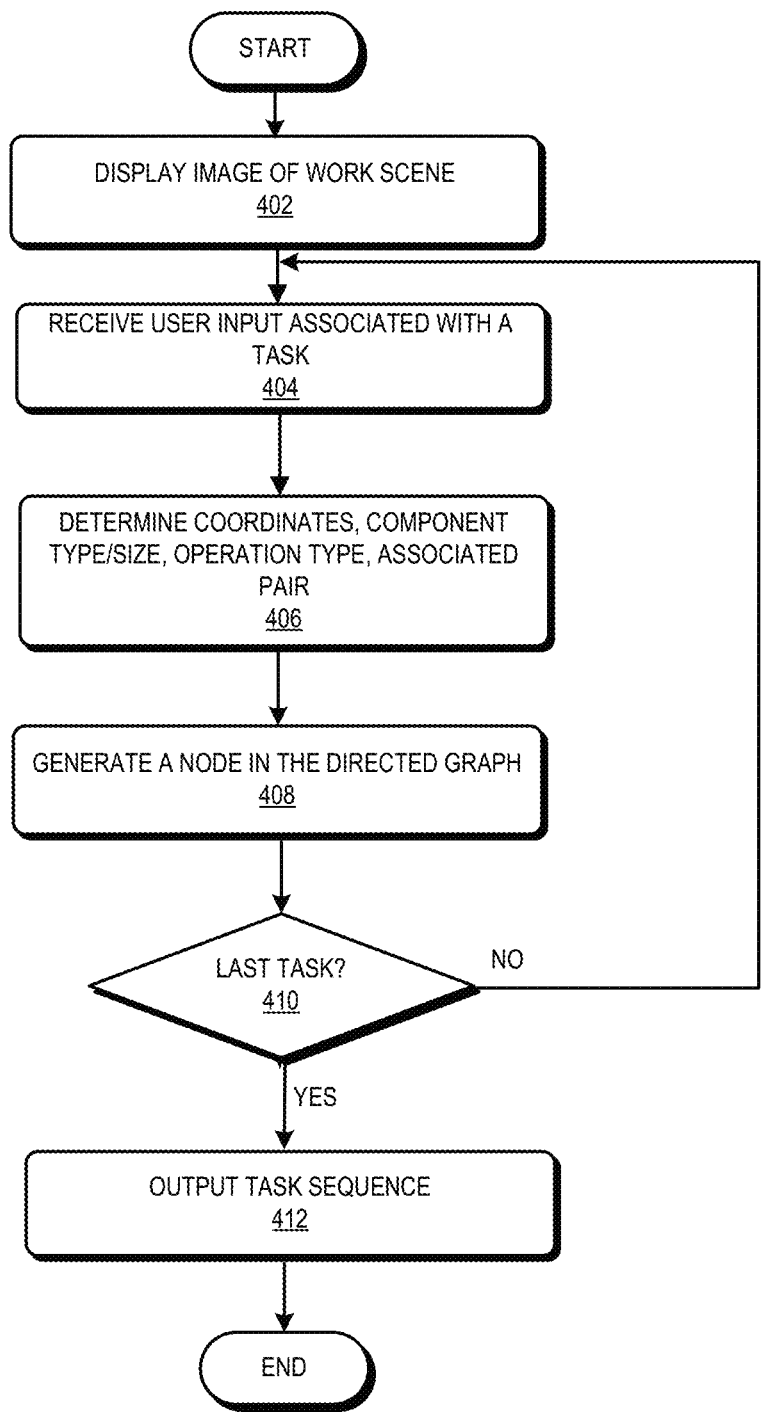
FIG. 4 presents a flowchart illustrating an exemplary process for configuring a task sequence, according to one embodiment.

FIG. 4 presents a flowchart illustrating an exemplary process for configuring a task sequence, according to one embodiment. During operation, the HMI system can display (e.g., on a touchscreen display) an image of the work scene (operation 402). The work scene can include a to-be-assembled electronic device and a number of components.

The HMI system can receive, from the user, an input associated with a task within a sequence of tasks (operation 404). The user input can be the user clicking or tapping a location or a component within the displayed image. Based on the user input, the HMI system can determine a location (e.g., the coordinates) within the work scene that corresponds to the pixel location of the user's input on the display, the type and size of the selected component, the type of operation be performed at the location or on the component, and, when applicable, the associated pair (operation 406). In some embodiments, the HMI system can communicate with the computer-vision system to determine, based on the image and the user input, the component type of the component selected by the user. For example, the computer-vision system can use a machine-learning technique (e.g., by performing neural-network-based image segmentation) to analyze the image to detect components included in the image and to identify the component selected by the user. The HMI system can then access a component library to obtain various information (e.g., size, operation type, associated pair, etc.) associated with the selected component.

Subsequently, the HMI system can generate a node corresponding to the task in a directed graph (operation 408). The directed graph can represent the task sequence, and the node can represent a task within the task sequence. In one embodiment, generating the node can include storing various information associated with the task (e.g., the task location, the type of component involved in the task, the size of the component, the operation type, the associated pair of the component, etc.) in the node. In a further embodiment, generating the node can also include presenting the various information associated with the task to the user to allow the user to verify and/or modify the task information.

The HMI system can determine whether the task is the last in the sequence (operation 410). In some embodiments, the HMI system can receive an input from the user indicating that the most recent task is the last task in the sequence. If the task is the last task, the HMI system can output the generated task sequence (operation 412). In some embodiments, the HMI system can output the task sequence to a task-sequence database. In one embodiment, the task sequence can be in the form of a directed graph (e.g., graph 210 shown in FIG. 2). If the task is not the last in the sequence, the HMI system can receive an additional input from the user (operation 404).

Once a task sequence (e.g., a directed graph) is defined, the robotic system can be configured to perform the entire task sequence automatically, without human intervention. To perform the task sequence, the robotic system can "reconstruct" the directed graph corresponding to the task sequence for the work scene encountered by the robotic system. The robotic system can then sequentially perform the operations/tasks corresponding to the nodes in the reconstructed directed graph, one operation/task at a time, until the entire task sequence is completed (i.e., every node in the reconstructed graph has been traversed). To reconstruct the directed graph, the computer-vision system can analyze the current work scene to locate various components and/or locations for placement of the components within the current work scene. Note that the current work scene typically can be similar but not identical to the work scene encountered by the robotic system during the configuration step. The computer-vision system can reconstruct the directed graph for the current work scene based on the original directed graph corresponding to the task sequence and the identified components/locations within the current work scene. More specifically, while reconstructing the graph, the computer-vision system can obtain the node information from the original directed graph and then generate a node in the reconstructed graph by identifying a corresponding component within the current work scene. The computer-vision system can subsequently send the reconstructed directed graph to the robotic controller, which can then control the robot (e.g., by sending appropriate motion commands) to perform the task sequence.

Figure 5A:
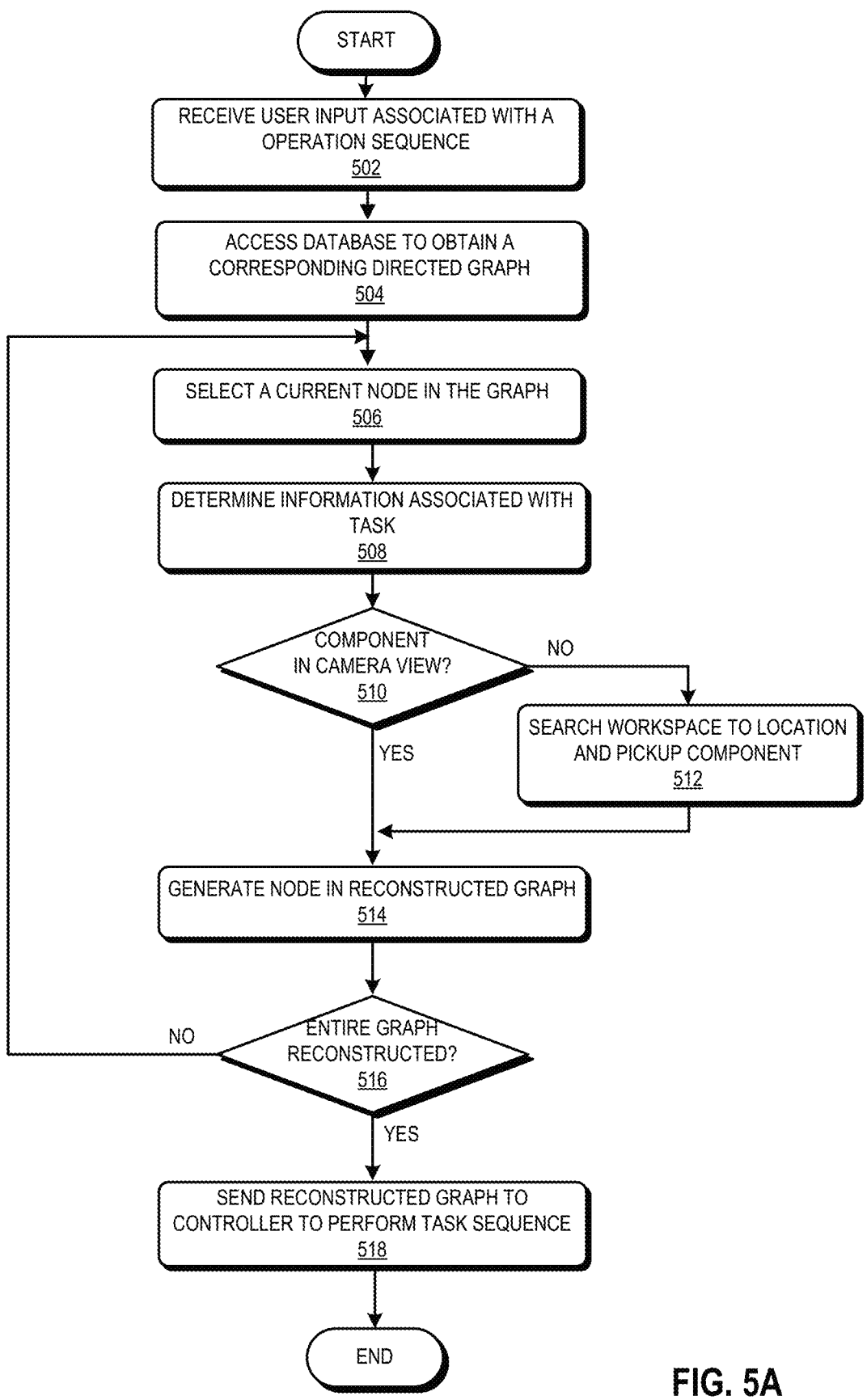
FIG. 5A presents a flowchart illustrating an exemplary process for performing a task sequence, according to one embodiment.

FIG. 5A presents a flowchart illustrating an exemplary process for performing a task sequence, according to one embodiment. During operation, the system can receive, via the HMI, a user input associated with a to-be-performed task sequence (operation 502). For example, the user can input a command to specify that the task sequence is to assemble a particular electronic device or a submodule of the particular electronic device. In one embodiment, the HMI can display a number of previously generated task sequences to allow a user to make a selection.

Responsive to the user input, the system can access the task-sequence database to obtain a directed graph corresponding to the to-be-performed task sequence (operation 504). Each node in the directed graph can correspond to a task within the task sequence. The system can then select, according to an order specified by the directed graph, a current to-be-processed node (operation 506). In one embodiment, the nodes in the directed graph can be indexed in ascending numerical order based on the execution order of the tasks (i.e., a node with a larger index corresponds to a later task), and the system selects a node with the smallest index as the current node.

In response to the selected node, the system can determine various information associated with the task corresponding to the node (operation 508). The task information can include but is not limited to: the task location, the type of component involved in the task, the size of the component, the operation type, the associated pair of the component, etc.

The computer-vision system can then determine whether the component involved in the operation is in the camera view (operation 510). In some embodiments, the camera(s) in the computer-vision system can capture an image of the work scene, and the perception unit within the computer-vision system can use a machine-learning technique to identify various components within the image. If the component is not in the camera view, the computer-vision system can search the workspace to locate and pick up the component (operation 512). Note that, if the operation type specified by the current node is an insertion operation, the computer-vision system can be configured to locate the associated pair. If the associated pair is not in the camera view, the computer-vision system can search the workspace to locate and pick up the associated pair. If the operation type is a placement operation, the computer-vision system can first locate the placement point and then determine whether the to-be-placed component is in the camera view. If the to-be-placed component is out of the camera view, the computer-vision system can search the workspace to locate and pick up the to-be-placed component.

The computer-vision system can subsequently generate a node in the reconstructed graph (operation 514). The node in the reconstructed graph corresponds to a node in the original directed graph associated with the task sequence. When generating the node in the reconstructed graph, information associated with the node (e.g., the location, the type/size of the component, the operation type, the associated pair, etc.) can be stored in the reconstructed graph. Note that the location of a component in the reconstructed graph may be slightly different from the location of the corresponding component in the original graph.

The system can then determine whether the entire graph is successfully reconstructed (operation 516). The system can compare the original graph obtained from the task-sequence database and the reconducted graph. If the entire graph is reconstructed, and the system can send the reconstructed graph to the robotic controller to control the robotic arm to perform the task sequence (operation 518). More specifically, the robotic controller can generate appropriate motion commands based on the reconstructed directed graph (i.e., according to the sequence of operations defined by the reconstructed graph) and send the motion commands to the robotic arm, causing the robotic arm to perform the task sequence. If the entire graph is not yet reconstructed, the next node in the directed graph corresponding to the task sequence is selected (operation 506).

Figure 5B:
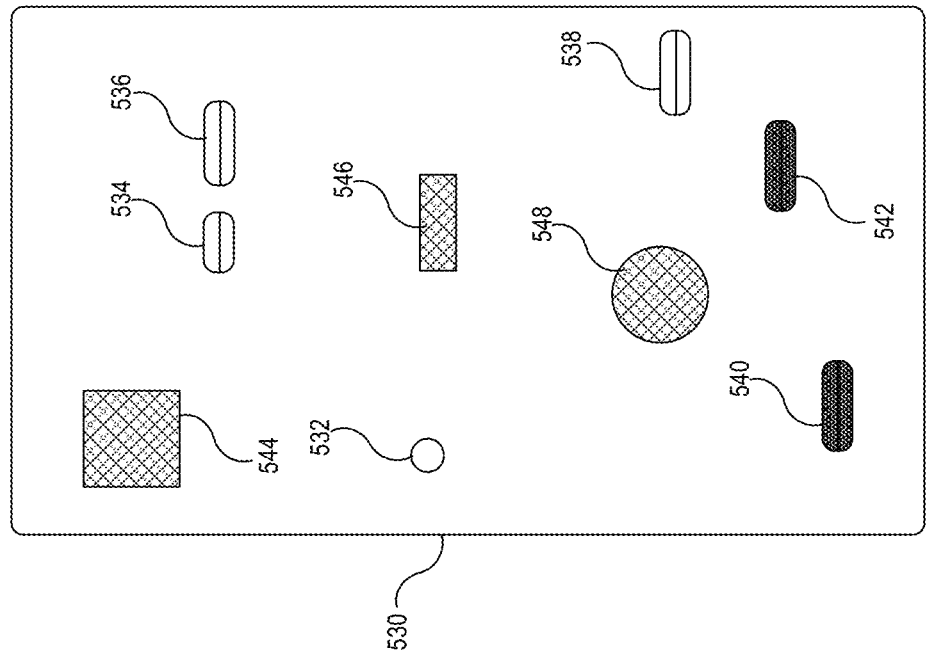
FIG. 5B illustrates an exemplary graph-reconstruction scenario, according to one embodiment.
Figure 5B:
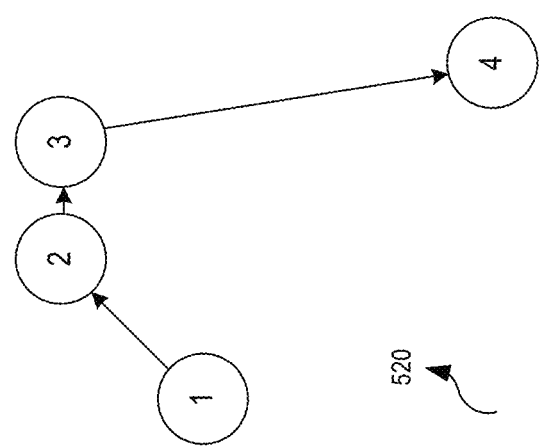

In some embodiments, the system can extract additional graph features (e.g., node distance and relation orientations of the components) from the directed graph. The system can iteratively reconstruct the graph based on belief propagation. FIG. 5B illustrates an exemplary graph-reconstruction scenario, according to one embodiment. The left drawing of FIG. 5B shows a directed graph 520 corresponding to a task sequence. Directed graph 520 can be similar to directed graph 210 shown in FIG. 2. The right drawing of FIG. 5B shows a current work scene 530, which can include many more components than the components represented by the nodes in directed graph 520.

More specifically, current work scene 530 can include a location and components 534-538 that correspond, respectively, to Node 1 through Node 4 of directed graph 520. Current work scene 530 can also include components (e.g., components 540 and 542) that are similar to the components represented by the nodes in directed graph 520. In addition, current work scene includes components (e.g., components 544-548) that are different from the components represented by the nodes in directed graph 520.

Based on directed graph 520, the system determines a list of components of interest. The system can then scan current work scene 530 and use the component-recognition algorithm (e.g., using Mask R-CNN based image-segmentation technique) to remove the background and components that are not in the list (e.g., components 544-548). A graph can be constructed based on the remaining components in work scene 530, with the nodes in the initial graph representing the remaining components in work scene 530. Information associated with each node in the graph (e.g., size, pose, location, etc.) can be obtained by 3D computer vision and from the component library.

The system can then match the nodes in the constructed graph with the nodes in the original directed graph. If each node in the original graph can be uniquely matched (based on the component type and size) to a corresponding node in the constructed graph, the graph has been successfully reconstructed. If not, the graph can be iteratively constructed (matched) using belief propagation. The marginal probability of two nodes connected by an edge can be computed using both the node and edge features. In this example, the edge feature can include the distance between the components. A graph configuration that maximizes this belief can be considered the final match and outputted as the reconstructed graph.

Figure 6:
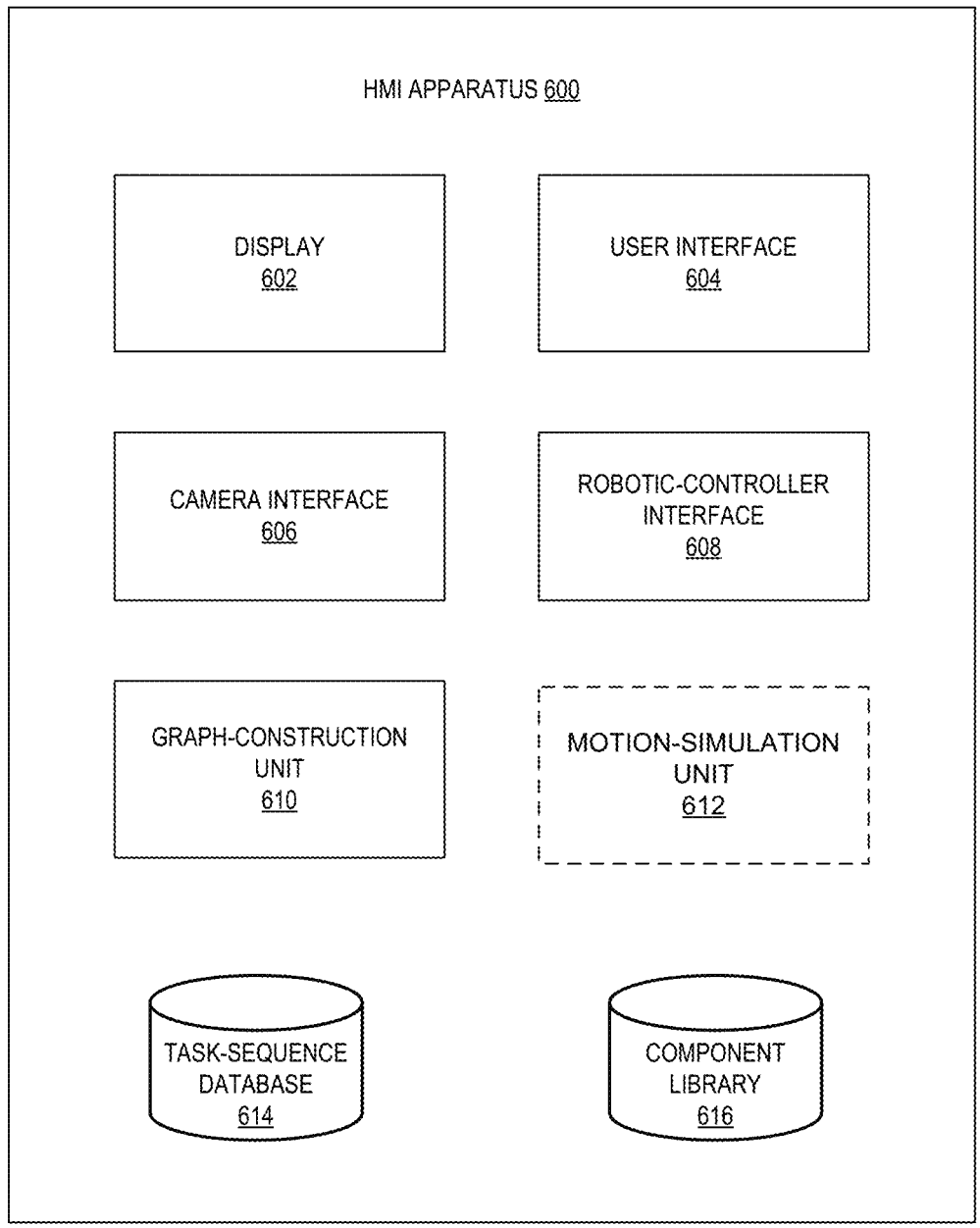
FIG. 6 shows a block diagram of an exemplary human-machine interface (HMI) apparatus for configuring a robotic system, according to one embodiment.

FIG. 6 shows a block diagram of an exemplary HMI apparatus for configuring a robotic system, according to one embodiment. HMI apparatus 600 can facilitate the interactions between the human user and a robotic system. HMI apparatus 600 can include a display 602, a user interface 604, a computer-vision interface 606, a robotic-controller interface 608, a graph-construction unit 610, an optional motion-simulation unit 612, a task-sequence database 614, and a component library 616.

Display 602 can be a conventional display or a touchscreen display. User interface 604 can be presented on display 602. User interface 604 allows the user to view the status of the robotic system and enter commands to configure the robotic system. If display 602 is a touchscreen display, the user can enter commands via user interface 604 using touch gestures.

Camera interface 606 allows HMI apparatus 600 to communicate with the computer-vision system. Images of the work scene captured by the camera(s) of the computer-vision system can be sent to HMI apparatus 600 via camera interface 606.

Robotic-controller interface 608 facilitates the communication between HMI apparatus 600 and the controller of the robot. HMI apparatus 600 can send task information (e.g., the task location, the component(s) involved in the task, etc.) to the robotic controller, such that the robotic controller can compute the pose for the robotic arm and generate motion commands to be sent to the robotic arm.

Graph-construction unit 610 can be responsible for constructing the directed graph during the configuration stage when the user configures the task sequence. More specifically, during the configuration stage of the robot, each time the user defines a task (e.g., by selecting a component in the image of the work scene), graph-construction unit 610 can add a node in the directed graph corresponding to the task. Various information associated with the task (e.g., the location, the type/size of the component, the operation type, the associated pair, etc.) can be determined by the computer-vision system and sent to graph-construction unit 610 via camera interface 606. Graph-construction unit 610 can in turn store such information in the corresponding node. During the operation stage of the robot, graph-construction unit 610 can reconstruct the graph corresponding to the task sequence being performed by the robotic system. More specifically, each time the robotic system completes a task, graph-construction unit 610 can add a node in the reconstructed graph.

Optional motion-simulation unit 612 can simulate the motion of the robotic arm for performing the task sequence. In some embodiments, motion-simulation unit 612 can receive, via robotic-controller interface 608, motion commands from the robotic controller and can simulate the motion of the robotic arm according to the received motion commands. The simulated motion can be displayed on display 602.

Task-sequence database 614 can store the generated task sequence (e.g., the directed graph constructed by graph-construction unit 610). Each node in the graph corresponds to a task, and various information associated with the task is stored in the node. The robotic controller can generate a motion plan based on the task information stored in the nodes. Component library 616 can store information associated with the various components involved in the task sequence. In some embodiments, component library 616 can store 3D models (e.g., 3D point clouds) of the components.

Figure 7:
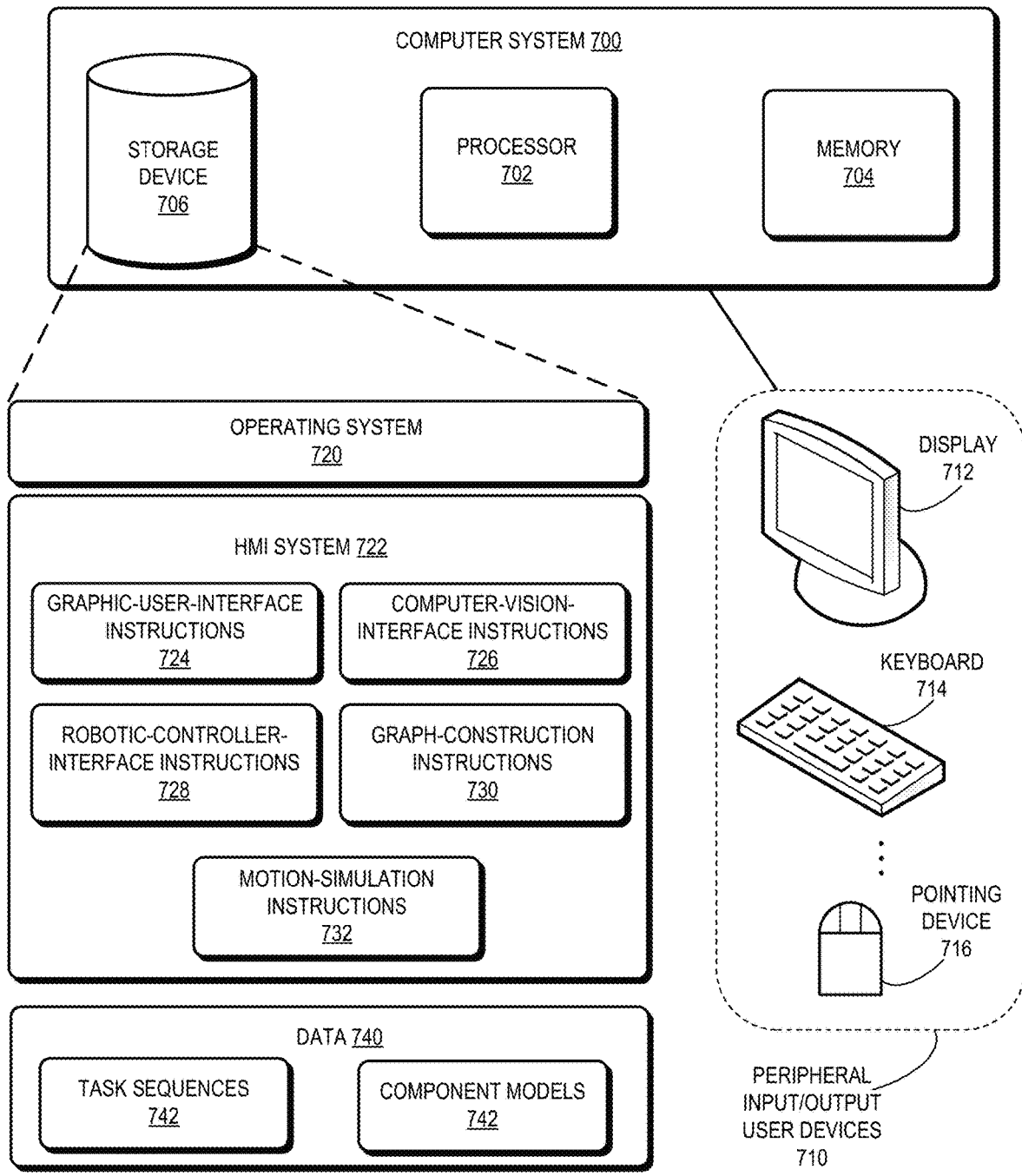
FIG. 7 illustrates an exemplary computer system that facilitates the operation of an HMI system, according to one embodiment.

FIG. 7 illustrates an exemplary computer system that facilitates the operation of the HMI system, according to one embodiment. Computer system includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, a computer-vision-control system 722, and data 740.

HMI system 722 can include instructions, which when executed by computer system 700, can cause computer system 700 or processor 702 to perform methods and/or processes described in this disclosure. Specifically, HMI system 722 can include instructions for implementing a graphical user interface (graphical-user-interface instructions 724), instructions for interfacing with a computer-vision system (computer-vision-interface instructions 726), instructions for interfacing with a robotic controller (robotic-controller-interface instructions 728), instructions for constructing or reconstructing a directed graph representing a task sequence (graph-construction instructions 730), and instructions for running robotic-arm-motion simulations (motion-simulation instructions 732). Data 740 can include task sequences 742 and component models 744.

In general, embodiments of the present invention can provide a system and method for configuring a robotic system to perform a sequence of tasks. The provided system can include an HMI that interfaces with the user, the computer-vision system of the robotic system, and the robotic controller. The HMI can present, to the user, a graphical user interface that displays an image of a work scene comprising a to-be-assembled device. The user can select, via the graphical user interface, multiple locations/components within the image according to the predetermined execution order of the tasks in the sequence. Each user selection (i.e., a location or a component) corresponds to a to-be-performed task (e.g., a placement task or an insertion task). For each user selection, the computer-vision system can determine the corresponding position in the work scene and various information associated with the task to be performed at that position. The system can further construct a directed graph, with each node in the graph corresponding to a user-defined task. The process of configuring the robotic system to perform a task sequence becomes the process of constructing a directed graph representing the task sequence, with each node in the graph representing a task and the task information stored in the node. After the configuration process is completed, the directed graph representing the task sequence can be stored (e.g., in a task-sequence database). When the robotic system needs to perform the task sequence, the robotic system can obtain the directed graph representing the task sequence and reconstruct the directed graph by performing the tasks specified by the nodes, one task at a time. More specifically, each time a task is performed a corresponding node can be generated in the reconstructed graph. The task sequence is completed once the entire graph has been reconstructed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware modules or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:
presenting, to a user on a graphical user interface, an image of a work scene comprising a plurality of components;
receiving, from the user, a sequence of operation commands, wherein a respective operation command corresponds to a pixel location in the image;
for each operation command, determining, based on the image, a task to be performed by a robotic system at a corresponding location in the work scene;
generating a directed graph based on the received sequence of operation commands and the image of the work scene, wherein each node in the directed graph corresponds to a task, and wherein each directed edge in the directed graph corresponds to a task-performing order;
capturing images of a second work scene;
reconstructing the directed graph for the second work scene based on the captured images; and
controlling the robotic system to perform a sequence of tasks at the second work scene based on the reconstructed directed graph.

2. The computer-implemented method of claim 1, wherein the graphical user interface comprises a touchscreen display, and wherein the respective operation command corresponds to the user tapping the pixel location in the image.

3. The computer-implemented method of claim 1, wherein determining the task to be performed at the corresponding location comprises:
converting the pixel location in the image to the corresponding location in the work scene; and
identifying a component located at the corresponding location in the work scene.

4. The computer-implemented method of claim 3, further comprising:
accessing a component library to obtain information associated with the identified component; and
presenting the information associated with the identified component to the user to allow the user to verify or modify such information.

5. The computer-implemented method of claim 4, wherein the information associated with the identified component comprises one or more:

a three-dimensional model of the component;
an operation type associated with the component; and
a second component to be coupled to the component.

6. The computer-implemented method of claim 1, wherein determining the task comprises receiving a user input indicating a component to be placed at the corresponding location in the work scene.

7. The computer-implemented method of claim 1, wherein controlling the robotic system to perform the sequence of tasks further comprises:
   for each node in the reconstructed directed graph, obtaining task information associated with a task corresponding to the node; and
   generating, by a controller of the robotic system, motion commands based on the obtained task information.

8. The computer-implemented method of claim 7, wherein the task information comprises one or more of:
   location information;
   component information; and
   operation type information.

9. The computer-implemented method of claim 8, wherein the operation type information indicates whether the task comprises an insertion task or a placement task.

10. An apparatus, the apparatus comprising:
   a graphical user interface to present an image of a work scene comprising a plurality of components and to receive, from a user, a sequence of operation commands, wherein a respective operation command corresponds to a pixel location in the image;
   a computer-vision system to determine, for each operation command and based on the image, a task to be performed by a robotic system at a corresponding location in the work scene;
   a graph-construction unit to generate a directed graph based on the received sequence of operation commands and the image of the work scene, wherein each node in the directed graph corresponds to a task, and wherein each directed edge in the directed graph corresponds to a task-performing order; and
   a robotic controller;
   wherein the computer-vision system is further to capture images of a second work scene,
   wherein the graph-construction unit is further to reconstruct the directed graph for the second work scene based on the captured images, and
   wherein the robotic controller is to control the robotic system to perform a sequence of tasks at the second work scene based on the reconstructed directed graph.

11. The apparatus of claim 10, wherein the graphical user interface comprises a touchscreen display, and wherein the respective operation command corresponds to the user tapping the pixel location in the image.

12. The apparatus of claim 10, wherein the computer-vision system is to:
   convert the pixel location in the image to the corresponding location in the work scene; and
   identify a component located at the corresponding location in the work scene.

13. The apparatus of claim 12, wherein:
   the computer-vision system is to access a component library to obtain information associated with the identified component; and
   the graphical user interface is to present the information associated with the identified component to the user to allow the user to verify or modify such information.

14. The apparatus of claim 13, wherein the information associated with the component comprises one or more:
   a three-dimensional model of the component;
   an operation type associated with the component; and
   a second component to be coupled to the component.

15. The apparatus of claim 10, wherein the graphical user interface is to receive a user input indicating a component to be placed at the corresponding location in the work scene.

16. The apparatus of claim 10, wherein the robotic controller is further to:
   for each node in the reconstructed directed graph, obtain task information associated with a task corresponding to the node; and
   generate motion commands based on the obtained task information.

17. The apparatus of claim 16, wherein the task information comprises one or more of:
   location information;
   component information; and
   operation type information.

18. The apparatus of claim 17, wherein the operation type information indicates whether the task comprises an insertion task or a placement task.

* * * * *